United States Statutory Invention Registration [19]

[11] Reg. Number: H769

Rouse et al.

[43] Published: Apr. 3, 1990

[54] METHOD OF FORMING A SAFE VISUAL SMOKE SCREEN

[75] Inventors: William G. Rouse, Aberdeen; Michael J. Burnham, Kingsville; Erica R. Riley, Bel Air; Janon F. Embury, Towson; Robert H. Frickel, Bel Air, all of Md.

[73] Assignee: The United States of America as represented by the Secretary of the Army, Washington, D.C.

[21] Appl. No.: 389,195

[22] Filed: Aug. 3, 1989

[51] Int. Cl.[4] ..... C06D 3/00; F42B 13/44

[52] U.S. Cl. ..... 102/334; 252/305

*Primary Examiner*—John F. Terapane
*Assistant Examiner*—Joseph Anthony
*Attorney, Agent, or Firm*—Anthony T. Lane; Edward Goldberg; Edward F. Costigan

[57] ABSTRACT

A minimum hazard visual screening cloud is formed comprised of an aerosol of fine spheres of a titanium dioxide composition, in which the particles are of submicron diameter. The cloud is formed by aerosolizing a compact mass of titanium dioxide spheres of submicron diameter through the action of explosively bursting such compact mass in the atmosphere at the desired cloud location.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF FORMING A SAFE VISUAL SMOKE SCREEN

GOVERNMENTAL INTEREST

The invention described herein may be manufactured, used and licensed by or for the Government for Governmental purposes without payment to us of any royalties thereon.

FIELD OF USE

This invention relates to a minimum hazard visual screening cloud and a method of forming such a cloud.

BACKGROUND OF INVENTION

Efforts to develop a minimum hazard visual screening cloud that will protect military equipment from visual detection and allow safe training have been under way for a number of years. Various military vehicles are conventionally equipped with smoke grenades and suitable launchers, such as launching tubes or barrels, singly or in clusters, whereby the grenades are launched to provide a visual screen relative to the vehicle.

SUMMARY OF INVENTION

It is an object of the present invention to provide a method for dissemination of visual screening composition in a manner compatible with current vehicle mounted smoke grenade launcher systems, so as to form an effective minimum hazard visual screening cloud.

Screening effectiveness is optimized by bursting in mid-air a high explosive central burster surrounded by densely compacted special titanium dioxide composition, compatible with the high explosive enabling the use of a volume-limited device such as a conventional screening grenade which may be launched form a conventional launch tube.

A further object is the forming of a minimal hazard screening cloud of substantial effectiveness.

Still other objects, features and attendant advantages will become more apparent from a reading of the following detailed description of an illustrative embodiment and mode of practice of the invention.

A minimum hazard visual screening cloud is formed in the atmosphere by projecting one or more burstable containers, such as conventional screening grenades, into the atmosphere at the desired location for formation of a screening cloud. This may be effected by launching grenades from a screening vehicle, as by use of conventional multiple launch tubes in a launcher mounted on the vehicle.

The screening cloud is formed of fine titanium dioxide particles in which the particles are of submicron diameter. It has been found that coated and sized titanium dioxide particles provide an effective, minimum hazard, visual screening cloud, and that an effective aerosoling of such particles may be accomplished by using particles of approximately 0.3 microns in diameter.

Titanium dioxide particles with siloxane coating, similar to those which are employed as pigments in the paint industry have been found to be highly suitable for practice of this invention.

These particles are suitably compacted as by wetting with 1, 1, 1-dichloroethane and subsequently drying a desired mass of such particles to form a compact generally cohesive mass of particles, in a configuration which enables ready explosive bursting to effect aerosoling of the particles in the atmosphere to thereby form the desired screening cloud.

It has been found that a hollow cylindrical or tubular shape is a desirable configuration to enable both adequate bursting of the compact particles, and also to enable its use in a conventional launchable grenade form.

In forming the minimum hazard visual screening cloud, the compacted hollow cylindrical mass of titanium dioxide spheres is explosively burst in the atmosphere by an HE explosive charge mass which is disposed within the hollow cylindrical compacted mass of particles. The term HE is generally accepted as being a composition whose consumption rate is 20,000 feet per second or more.

A ratio of the weight of the compacted mass of particles relative to the HE explosive charge mass may be employed within the general range of approximately 15:1 to 30:1, with an optimum ratio being approximately 25:1, particularly for titanium dioxide. This yields maximum visual screening attenuation over an adequate area to screen the source vehicle and surrounding personal or vehicles from enemy vehicles and enemy personnel, consistent with the conventional grenade volume constraints imposed by launching from a conventional launch tube of relatively small size.

A particular advantage of the treated titanium dioxide composition, for the compacted particles is the ability of these particles to provide a highly effective minimum hazard visual screening cloud while not flashing or igniting as a result of the explosive bursting of the compact mass by the HE explosive.

It has been found that clouds 7 to 10 meters in diameter may be readily formed according to the invention with excellent attenuation throughout the visible wavelength regions.

A suitable vehicle for carrying out the method and forming a screening cloud according to the invention is a conventional self-propelled grenade which is launchable from a conventional launch tube mounted on a vehicle or otherwise as desired.

The conventional grenade has a frangible plastic body within which is a hollow cylinder or tube of compacted titanium dioxide particles as previously described. Within the hollow cylindrical mass of compacted particles is a cylinder of HE explosive, which may be of any conventional HE composition. A guide tube and support tube may be employed between the hollow cylindrical mass and the cylindrical HE mass with a plastic cover suitably secured over the end thereof, as by ultrasonic welding.

The grenade is self-propelled by a propellant charge which may be ignited as by an electric squib or electric match. The propellant gases produced vent through conventional side vents leading from the propellant chamber and out through thin-walled blow-outs in a propellant cover.

A suitable pyrotechnic time delay may be ignited directly by the burning propellant to enable a desired time delay after launch before burst of the HE charge.

One or more percussive detonators which may be of successively increasing power, may be employed in the ignition/detonation path leading to the HE mass. In one embodiment, an ignitable relatively low power detonator would activate a higher power conventional booster lead, which in turn would set off an explosion of the HE explosive mass, to thereby effectively break up the particles and aerosolize the fine mass and thus form a desired minimum hazard visual screening cloud in the atmosphere at the desired location.

By launching multiple grenades from launchers over a desired area, it will be appreciated that a screening cloud of desired size may be formed so as to screen a relatively wide area from enemy vehicles and enemy personnel.

While the invention has been illustrated and described with respect to a single embodiment, it will be appreciated that various modifications and improvements may be made without departing from the scope and spirit of the invention. Accordingly, the invention is not to be limited by the particular embodiment, but only by the scope of the appended claims.

The foregoing disclosure is merely illustrative of the principles of this invention and is not to be interpreted in a limiting sense. We wish it to be understood that we do not desire to be limited to the described because obvious modifications will occur to a person skilled in the art.

We claim:

1. In an improved method of screening against visual light transmission, the improvement comprising injecting into the atmosphere a screening cloud of fine particles comprised of titanium dioxide composition, in which the particles are coated and of submicron diameter, said cloud being formed by bursting a compacted generally cohesive solid mass of said particles in the atmosphere to there aerosolize and disperse said particles in the atmosphere.

2. The method according to claim 1, in which said particles are formed of a titanium dioxide compound.

3. The method according to claim 1, in which said particles are coated with siloxane to retain their individual identity.

4. The method according to claim 3, in which said particles are generally of a size of between about 0.2–0.5 microns in diameter.

5. The method according to claim 4, in which said particles are generally spherical in size and shape.

6. The method according to claim 1, in which said bursting is effected by bursting an HE explosive charge within said compacted cohesive mass of titanium dioxide powder.

7. The method according to claim 6, the ratio of the weights of said compacted cohesive mass of particles relative to said HE explosive charge being within the range of approximately 15:1–30:1.

8. The method according to claim 7, wherein the screening cloud is minimally hazardous to people, animals and the environment.

* * * * *